E. A. WALKER.
Scroll-Sawing Machines.
No. 142,361. Patented September 2, 1873.
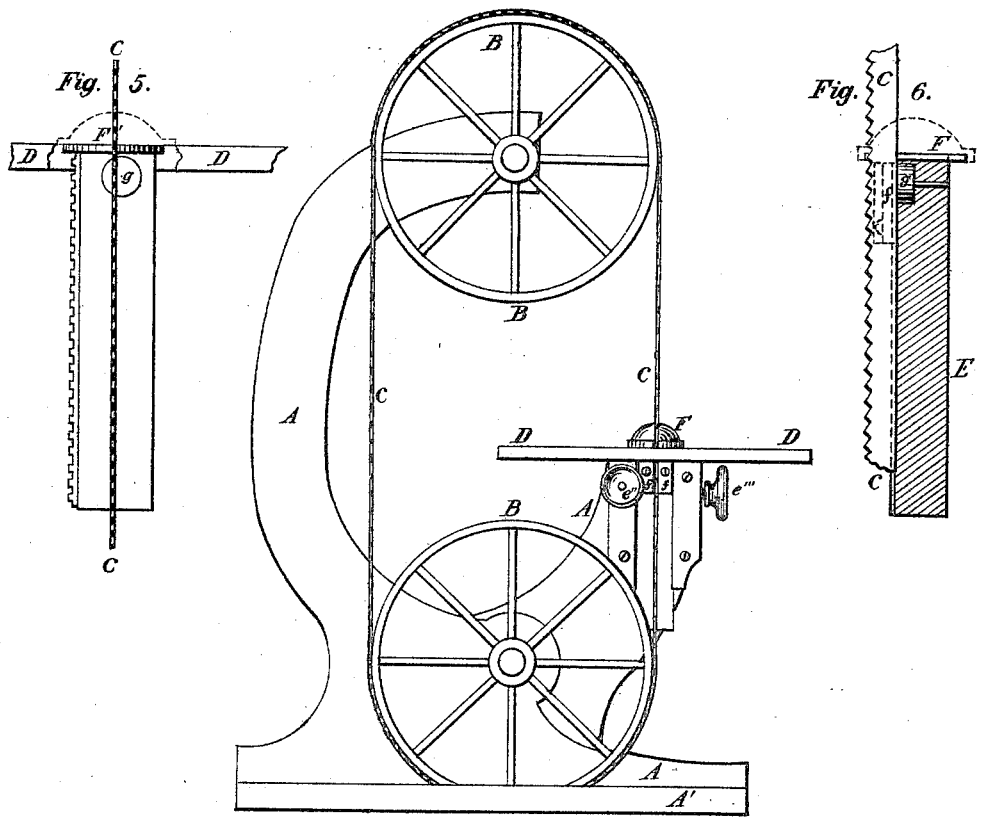
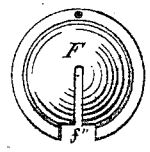
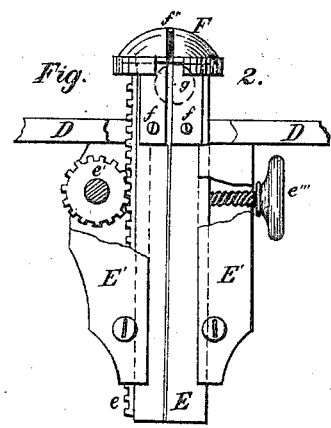
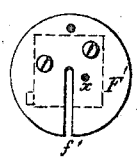
Attest:
A. T. Lacey
W. Burkis
Inventor:
Edward A. Walker
By N. Crawford, atty.

UNITED STATES PATENT OFFICE.

EDWARD A. WALKER, OF MINNEAPOLIS, MINNESOTA.

IMPROVEMENT IN SCROLL-SAWING MACHINES.

Specification forming part of Letters Patent No. 142,361, dated September 2, 1873; application filed May 13, 1873.

*To all whom it may concern:*

Be it known that I, EDWARD A. WALKER, of Minneapolis, in the county of Hennepin, in the State of Minnesota, have made certain Improvements in Band and Scroll Saws, of which the following is a specification:

The invention consists in the construction of the parts that are claimed as the improvements, as will be more fully hereinafter described; and the object of the invention is to introduce into scroll and band sawing-machines a means of supporting the stuff to be sawed in whatever angle it may be desired to saw the same, and to provide a means for guiding, supporting, and reducing the friction of the saw in its work, and also adjusting the support to accommodate the different thicknesses of stuff or length of saw in scroll-saws.

In the drawings, Figure 1 is a side elevation of the machine. Fig. 2 is a view of some of the parts enlarged. Fig. 3 is a view of the removable support. Fig. 4 is a top view of the adjustable sliding block on which the removable support rests. Figs. 5 and 6 are details in section.

A represents the frame or support of the operating parts and table. A' is the horizontal foot or base of the frame. B B are the usual band-saw pulleys. C is the band-saw; D, the saw-table, flat on its top surface, and secured firmly upon the frame A, in the position seen in Fig. 1, and has an opening vertically through it to allow the adjusting-block to freely slide therein, and slot to permit the saw to be put into position. E is a sliding block, sliding between guide-ways E' E' that are made fast upon the frame A underneath the table D, and on one side is a toothed rack, e, adjusted by the toothed pinion e' gearing into rack e, and operated by the thumb-nut e'', and, when adjusted to the proper height, is held by the holding-screw e''' that is screwed through one of the guide-ways E', so that the end of the holding-screw will bear against the side of block E and hold it in position. On the top end of block E is a plate, F', that has a slit, f', in it for the saw to work in, and of the size to freely slide in the opening in the top of the table D. g is a disk friction-wheel, pivoted and embedded in the block E, near its upper end, and in such a position that the back edge of saw C will, when working, bear against the face of said disk at one side of its center, or so that the disk-wheel will be revolved slowly by the action of the saw, forming a firm support for the saw against the lateral strain when working, and at the same time relieving it from friction, as well as preventing wear by channeling into the side of the disk-wheel by the action of the back of the saw bearing against the face of said disk-wheel. The disk-wheel is oiled through hole X in plate F'. *f f* are guides, between which the saw works, and are of two or more thicknesses, held in position by screws, so as to be adjusted as to distance from each other, and the outside or face pieces, when necessary, can be removed. When a narrow saw is used these guides are of leather or other proper material. F is a removable rest, conical in form, or of such shape that its highest portion will be at or near the line of the teeth of the saw, where it passes through the slit *f''* that is made in the rest F to receive the saw, and is firmly held on the top of plate F', that is fast on the top of block E, and with the block E is adjusted to any desired height to saw stuff of different thicknesses.

As band or scroll saws have heretofore been arranged, no provision was made for sawing stuff having irregular angles and curves on differing angles, as the stuff to be sawed rested upon the top of a plane or flat table, and could not be tipped to saw to varying angles with relation to the table, and be firmly held; but by having this removable rest any form of work having various angles and curves with differing angles can be sawed, such as hand-rails for stairs, angular and curved ornaments, fancy brackets used in finishing steamboat and other fine work, by simply guiding the stuff being sawed by hand, and saw the required angle or curve, and have the support of the stuff where the action of the saw is had, so that there is no strain or jar upon the operator's hands or arms, and the stuff is free to be changed in position, as may be required.

It is evident that this adjustable rest and friction-wheel disk can be applied to scroll as well as band saws, and can be so done without change of construction; and when the work to be done by the saw on the table does not require the rest F it can be removed, and the plate F' will be adjusted to be even with the top of table D, when the ordinary work can be done by the same saw.

Having thus described my invention, what I claim, and desire to secure by Letters Patent, is—

1. The removable rest F, constructed and arranged, with relation to the saw C, substantially as and for the purpose described.

2. The removable rest F, in combination with the adjustable sliding block E, in the manner and for the purpose described.

3. A band sawing-machine in which is arranged an adjustable sliding block, E, having a friction disk-wheel, g, therein, and on which block is a conical removable rest, F, substantially as described.

EDWARD A. WALKER.

Witnesses:
 CHAS. H. WOODS,
 GEO. W. CHOWM.